United States Patent [19]

Ponce et al.

[11] Patent Number: 4,943,749
[45] Date of Patent: Jul. 24, 1990

[54] METHOD AND APPARATUS FOR CONDUCTING CURRENT FROM A DYNAMOELECTRIC MACHINE

[75] Inventors: Hector O. Ponce, Pensacola; Aleksandar Prole, Winter Springs, both of Fla.

[73] Assignee: Westinghouse Electric Corp., Pittsburgh, Pa.

[21] Appl. No.: 288,369

[22] Filed: Dec. 22, 1988

[51] Int. Cl.$^5$ .......................... H02K 3/50; H02K 1/18
[52] U.S. Cl. .................................... 310/260; 29/596; 310/71
[58] Field of Search ............... 310/260, 71; 29/254, 29/596

[56] References Cited

U.S. PATENT DOCUMENTS

| 905,889 | 12/1908 | Lamme | 310/260 |
| 4,199,700 | 4/1980 | Daugherty et al. | 310/260 |
| 4,254,352 | 3/1981 | Fidei et al. | 310/71 |
| 4,314,173 | 2/1982 | Srdoch | 310/260 |
| 4,501,985 | 2/1985 | Dobson et al. | 310/270 |

FOREIGN PATENT DOCUMENTS 557104 12/1974 Switzerland .................. 310/260

Primary Examiner—Patrick R. Salce
Assistant Examiner—D. L. Rebsch

[57] ABSTRACT

A parallel conducting ring structure for a dynamoelectric machine is configured to be mounted as a subassembly upon a conventional support cone for wholesale installation through an opening formed in an axial end of the casing structure surrounding the stator core of a dynamoelectric machine. Tab connections are attached, at preselected locations about the axis of the stator core, to the parallel conducting ring structure and are insulated with conventional groundwall insulation. Depending upon the particular direction of rotation of the rotor and upon the direction in which the generated electromotive forces are to peak, each direction of which is selected by the utility, the subassembly is installed within the casing structure through the opening, and adapted for such particular directions by stripping the insulation from selected ones of the tab connections, attaching the main leads exiting the casing structure to such tab connections, and leaving the remaining ones of the tab connections insulated.

16 Claims, 6 Drawing Sheets

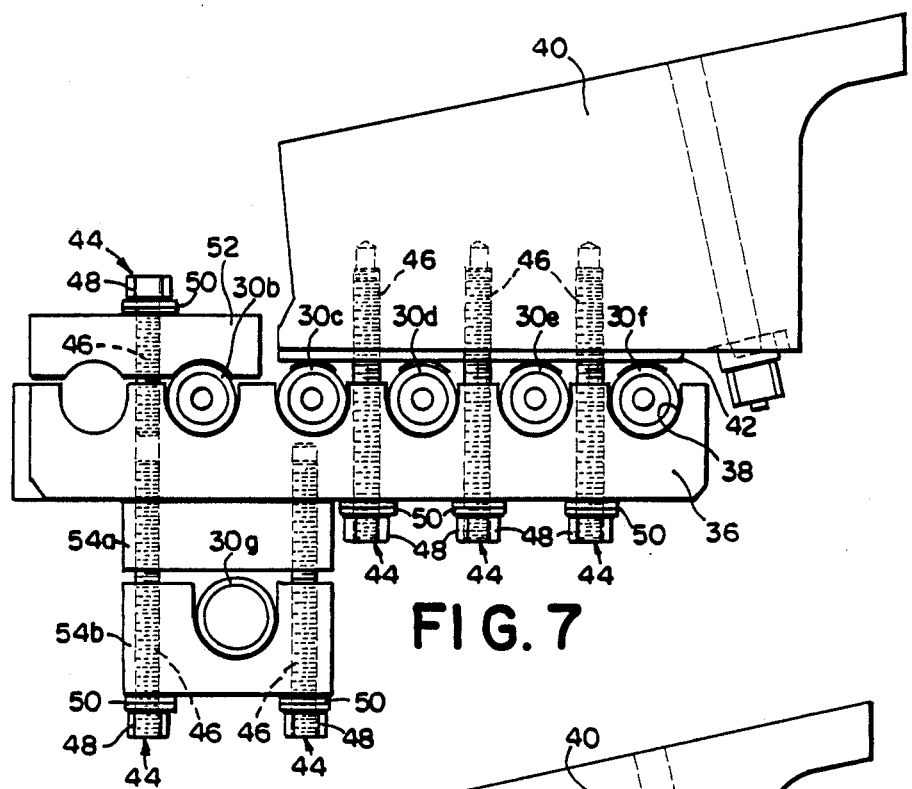
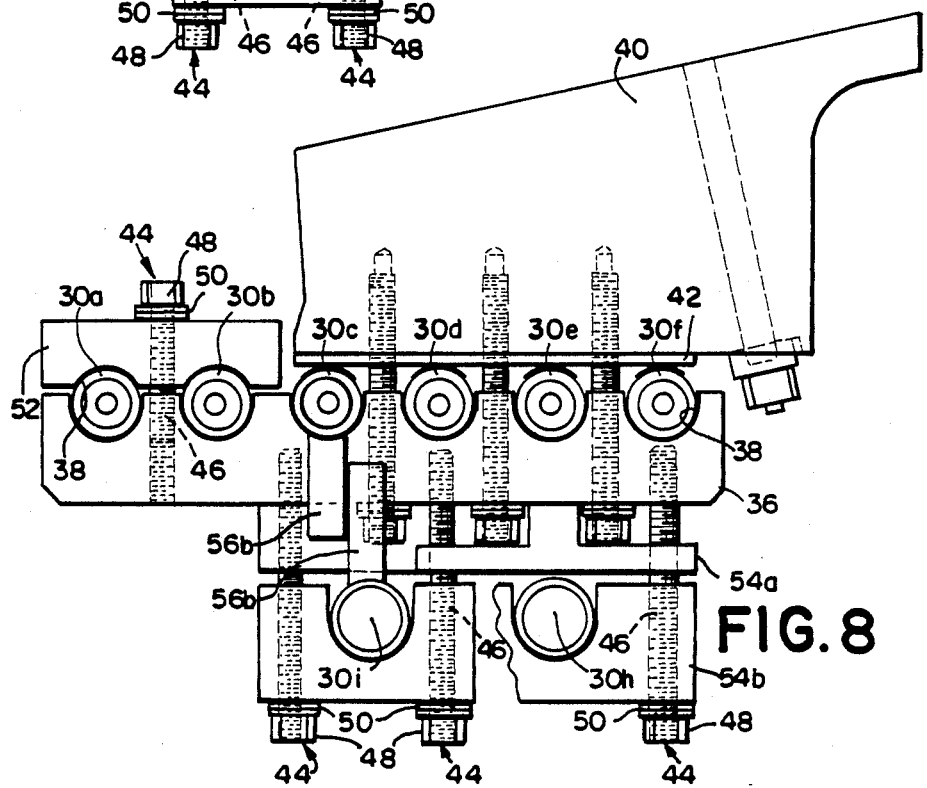

METHOD AND APPARATUS FOR CONDUCTING CURRENT FROM A DYNAMOELECTRIC MACHINE

BACKGROUND OF THE INVENTION

1. Field of the Invention

This invention relates generally to parallel rings utilized in dynamoelectric machines, and more particularly to methods and apparatus for conducting current from the coils of such dynamoelectric machines.

2. Statement of the Prior Art

Stator windings in large dynamoelectric machines such as turbine generators are disposed within generally cylindrical stator cores. The stator windings of multiphase generators include a plurality of phase zones each of which constitute a plurality of coil sides. All the coil sides in each phase zone except those constituting the terminal coil side portions are serially connected at each axial end of the stator core. The unconnected ends of the terminal coil sides constitute terminals which are radially separated from the axis of the stator core by discrete radial distances at a first axial end of the stator core.

Parallel conducting ring structures are disposed at the first axial end of the stator core and include a plurality of parallel rings in order to conduct the current generated by the turbine generator externally from such generator. Phase leads connect the coil terminals to the appropriate parallel rings, and the main leads which exit the casing structure surrounding the stator core are thereafter connected to the parallel rings.

A major problem that is associated with the refurbishment, or rewinding, of conventional turbine generators is that the particular way in which the main leads are connected to the parallel rings depends upon a direction of rotation of the turbine rotor, and upon the sequence in which the utilities wish the generated electromotive forces to peak. That is, depending upon the particular direction of rotation of the rotor (as set by the turbine), the parallel conducting ring structure must be so configured as to peak the generated electromotive forces as required by the utility. Looking at the exciter end of the dynamoelectric machine, some utilities require that the electromotive forces will reach their positive maximum values from left to right at their terminals or bushings (sometimes referred to as T1-T2-T3 or A-B-C in three-phase generators), while other utilities require that the electromotive forces will reach their positive maximum value from right to left.

Within the power generation industry, especially for turbines manufactured by the assignee of the present invention, a "standard" parallel ring connection consists of a counter-clockwise rotation of the turbine's rotor (as viewed from the exciter end of the stator core) together with a peaking of the generated electromotive forces on the main leads in a direction of from left to right (i.e., T1-T2-T3 and T4-T5-T6). An "opposite" parallel ring connection, on the other hand, consists of a counter-clockwise rotation of the turbine's rotor together with a peaking of the generated electromotive forces on the main leads in a direction of from right to left (i.e., T3-T2-T1 and T6-T5-T4).

One means of illustrating the nature of the "standard" parallel ring connections in comparison to "opposite" parallel ring connections would be to juxtapose arrows which would indicate the direction of both conditions (i.e., the direction of rotation of the turbine's rotor and the direction of the peaking of the generated electromotive forces). As viewed from the exciter end of the stator core, both arrows would be going in the same direction for the "standard" parallel ring connection, while for the "opposite" parallel ring connection the arrows would be going in opposite directions.

Of course the same conditions would apply for turbines having a clockwise rotor rotation together with a peaking of the generated electromotive forces in a direction of from right to left (also "standard"), and for turbines having a clockwise rotor rotation together with a peaking of the generated electromotive forces in a direction of from left to right (also "opposite"). It should, therefore, be understood that the term "standard" as used hereinafter will refer to the conditions in which the direction of rotation of the turbine's rotor is the same as the direction in which the generated electromotive forces peak, while the term "opposite" as used hereinafter will refer to the conditions in which the direction of rotation of the turbine's rotor is opposite the direction in which the generated electromotive forces peak.

Once the utility specifies its particular needs, which are dependent upon the particular connection of the turbine to the generator (which determines the direction of rotation of the turbine's rotor) and the desired direction in which the generated electromotive forces are to peak, manufacturers of dynamoelectric machines build the correct configuration into the machine. However, this can be disadvantageous when the machine requires refurbishment since the lead time which is required to correctly configure the machine often necessitates lengthy delays.

While the above described problem can be somewhat alleviated by designing a single, adaptable configuration for the parallel conducting ring structure which would satisfy the needs of utilities that utilize either standard or opposite parallel ring connections, a further problem is associated with the installation of such an adaptable configuration into the generator to be refurbished due to the limited access which is provided by a conventionally-sized opening in the axial end of a typical casing structure. It would also be desirable, therefore, to provide a method and apparatus for subassembling the parallel conducting ring structure such that the subassembly may be easily installed within conventionally-sized openings found in the axial end of the casing structure which surrounds the stator core.

SUMMARY OF THE INVENTION

Accordingly, it is a general object of the present invention to provide a method and apparatus for conducting current generated by a dynamoelectric machine externally from that machine. More specifically, it is the object of the present invention to provide a method and apparatus for conducting current from the coils of a dynamoelectric machine regardless of its "standard" or "opposite" nature.

Another object of the present invention is to provide a method and apparatus for conducting current externally from a dynamoelectric machine in which a subassembly comprising the parallel conducting rings mounted upon a conventional support cone can be easily installed within an opening formed in an axial end of the dynamoelectric machine.

Still another object of the present invention is to reduce the time which is necessary to refurbish, or rewind, typical dynamoelectric machines.

Briefly, these objects are accomplished according to the present invention by configuring the parallel conducting ring structure such that the structure may be mounted as a subassembly upon a conventional support cone for wholesale installation through the opening formed in an axial end of the casing structure surrounding the stator core of a dynamoelectric machine. A plurality of tab connections are attached, at preselected locations about the axis of the stator core, to the parallel conducting ring structure and are insulated with conventional groundwall insulation. Depending upon the particular configuration of the machine (i.e., whether it is "standard" or "opposite"), selected by the utility, the subassembly is installed within the casing structure through the opening, and adapted for such particular configuration by stripping the insulation from selected ones of the tab connections, attaching the main leads exiting the casing structure to such tab connections, and leaving the remaining ones of the tab connections insulated.

The above and other objects, advantages and novel features according to the present invention will become more apparent from the following detailed description of the preferred embodiment when considered in conjunction with the accompanying drawings wherein:

BRIEF DESCRIPTION OF THE DRAWINGS

FIGS. 7 and 8 are enlarged views of the mounting of full phase or "double" current rings utilized in accordance with the present invention;

DESCRIPTION OF THE PREFERRED EMBODIMENT

Figure 1:
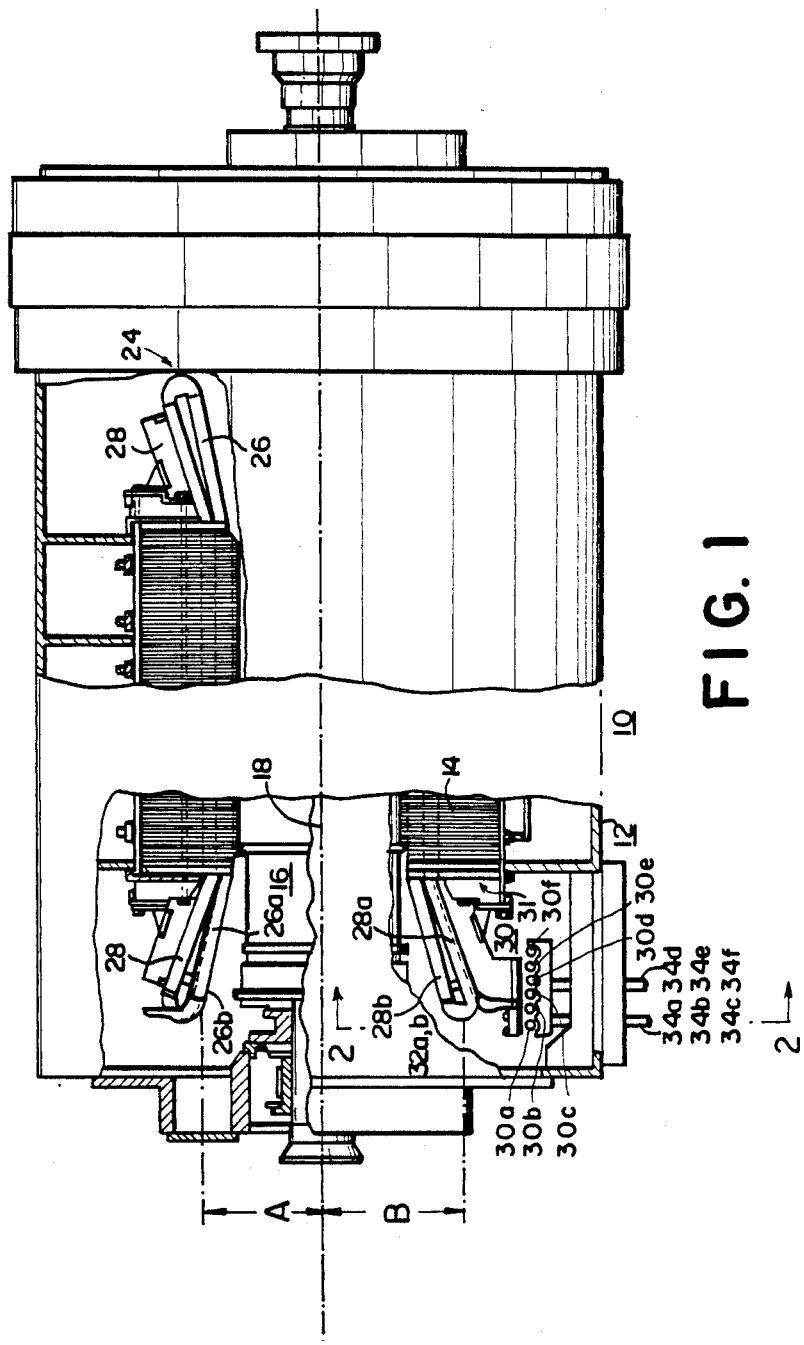
FIG. 1 is a partial, transverse sectional view of a dynamoelectric machine according to the present invention.

Referring now to the drawings, wherein like characters designate like or corresponding parts throughout the several views, there is shown in FIG. 1 a partial transverse sectional view of a dynamoelectric machine 10, such as a turbine generator, having a casing structure 12 which houses a laminated stator core 14 and a rotatable rotor 16. The stator core 14, as is conventional, is a cylindrical structure disposed about an axis 18 which is coincidental with the axis of rotation of the rotor 16.

Figure 2:
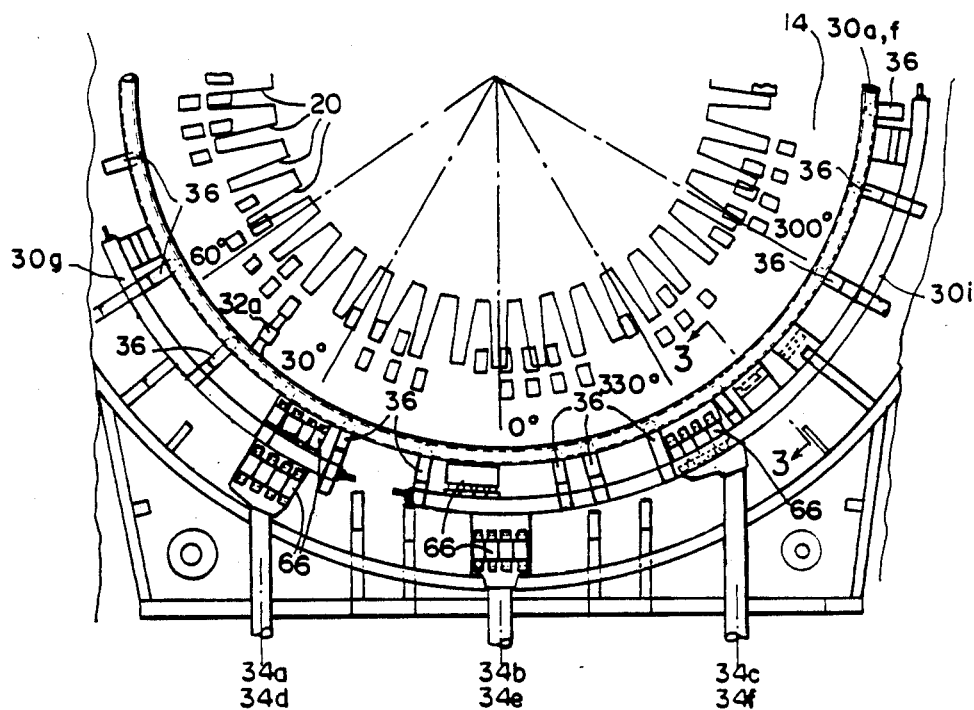
FIG. 2 is a partial sectional view of the dynamoelectric machine shown in FIG. 1, taken along the lines 2—2, as configured in accordance with the present invention for a standard parallel ring connection.
Figure 3:
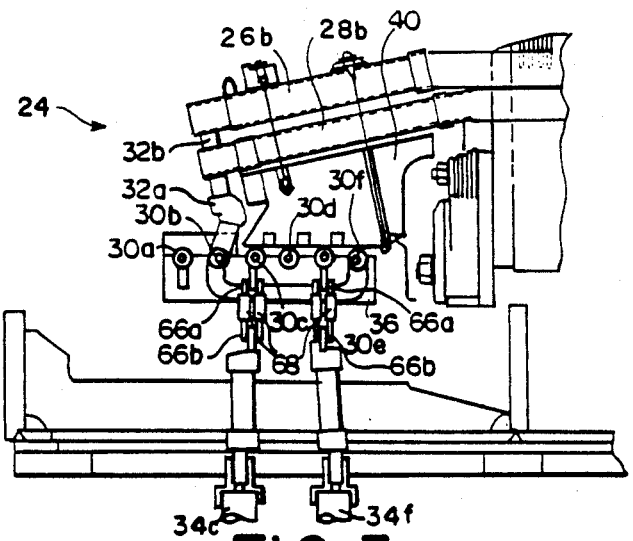
FIG. 3 is an enlarged view of the parallel ring structure shown in FIG. 2, taken along the lines 3—3.
Figure 4:
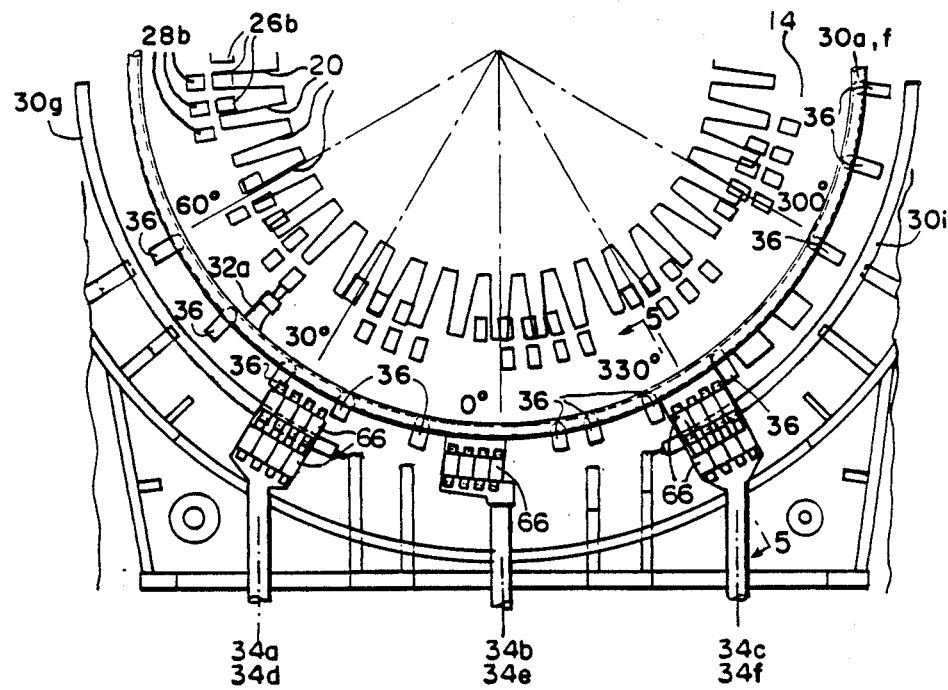
FIG. 4 is a partial sectional view of the dynamoelectric machine shown in FIG. 1, taken along the lines 2—2, as configured in accordance with the present invention for an opposite parallel ring connection.
Figure 5:
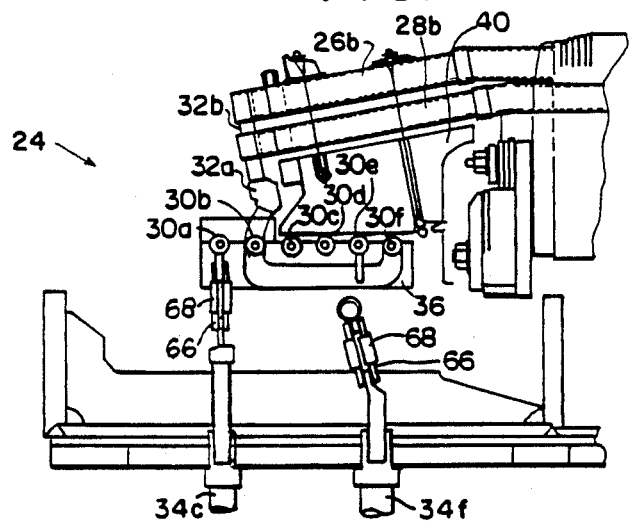
FIG. 5 is an enlarged view of the parallel ring structure shown in FIG. 4 taken along the lines 5—5.

Axial slots 20, as are shown in FIGS. 2 and 4, are formed on the radially inner periphery of the stator core 14 for reception of a stator winding, generally indicated in the drawings as 22. The stator winding 22 includes a plurality of interconnected coils 24 which are formed by electrically connecting a suitable number of half coils or coil sides 26 and 28 which are respectively disposed in different axial slots 20 and are connected in the axial end regions of the dynamoelectric machine 10. Coil sides 26 and 28 are respectively disposed in the radially inner and radially outer portions of different axial slots 20. While the stator winding 22 illustrated in the figures has two coil sides disposed in each axial slot, it is to be understood that any number of coil sides may be disposed in each axially extending slot, with each of those coil sides being interconnectable with coil sides disposed in other slots which are circumferentially displaced therefrom.

Each stator coil includes two coil terminating sides 26a and 28a respectively disposed in a radially inner or top portion of a slot and the radially outer or bottom portion of the slot. The ends of coil sides 26a and 28a respectively constitute electrical phase terminals 26b and 28b which are respectively disposed at radial distances A and B from the axis 18.

A set of parallel conducting ring structures 30 are circumferentially disposed about stator core 14 at one axial end 31 thereof. The six illustrated conducting ring structures 30, respectively, include parallel conducting rings 30a, 30b, 30c, 30d, 30e, and 30f which are each electrically connected to a separate phase terminal 26b and 28b by phase leads 32a and 32b, respectively. Furthermore, each of the conducting rings 30a through 30f are electrically connected to main leads 34a, 34b, 34c, 34d, 34e, and 34f in order to conduct the current generated by the dynamoelectric machine 10 externally therefrom.

It should be noted at this juncture that the number of axially adjacent parallel conducting rings actually varies in the circumferential direction according to the number of phases, the series or parallel character of the stator winding, and the split or full character of the phase zones of the stator winding. For example, a four-pole, three phase dynamoelectric machine 10 is shown for the illustrated embodiment.

One problem, as noted above, with respect to the refurbishment of typical dynamoelectric machines is the time involved in preparing the apparatus to be incorporated within a specific machine. That is, depending upon the particular configuration of the machine, the parallel conducting ring structure must be so configured as to peak the generated electromotive forces accordingly. Looking at the exciter end of the dynamoelectric machine 10 as shown in FIGS. 2 and, some utilities require that the generated electromotive forces peak from left to right (sometimes referred to as T1-T2-T3 or A-B-C) at their terminals or bushings, while other utilities require that the generated electromotive forces peak from right to left (T3-T2-T1 or C-B-A). Such rotations in combination with a counter-clockwise rotation of the rotor 16 are typically provided for, respectively, by a "standard" parallel ring connection or by an "opposite" parallel ring connection as explained herein above. Once the utility specifies its particular need, manufacturers of dynamoelectric machines build the correct configuration into the machine. This is disadvantageous in that the lead time which is required to correctly configure the machine often times delays refurbishment of the machine. It is, therefore, the primary objective of the present invention to provide a method and apparatus for assembling the parallel conducting ring structure within the dynamoelectric machine regardless of the particular configuration of the machine (i.e., whether "standard" or "opposite").

As is also shown in the figures, the stator core 14 is of usual laminated construction. The stator winding coils 24 are of the liquid cooled type and comprise hollow conductors having internal passageways which open to coolant headers (not shown) which manifold coolant through the internal passageways. In this preferred embodiment according to the present invention, the diameter of the conductors themselves is chosen to accommodate an amperage rating of approximately 36,000 amperes. Accordingly, the conductors of the parallel conducting rings are conventionally formed of copper pipe having an outside diameter of approximately 1.75 inches and an inside diameter of approximately 0.75 inches. The full phase or "double" current rings, as will be explained in greater detail herein below, are also formed of copper pipe having an outside diameter of approximately 2.75 inches and an inside diameter of approximately 1.00 inches. Both types of copper pipes are further insulated (to a rating of approximately 26 kilovolts) by covering same with an insulative material, such as glass-backed mica paper, of approximately 0.38 inches thickness.

Figure 6A:
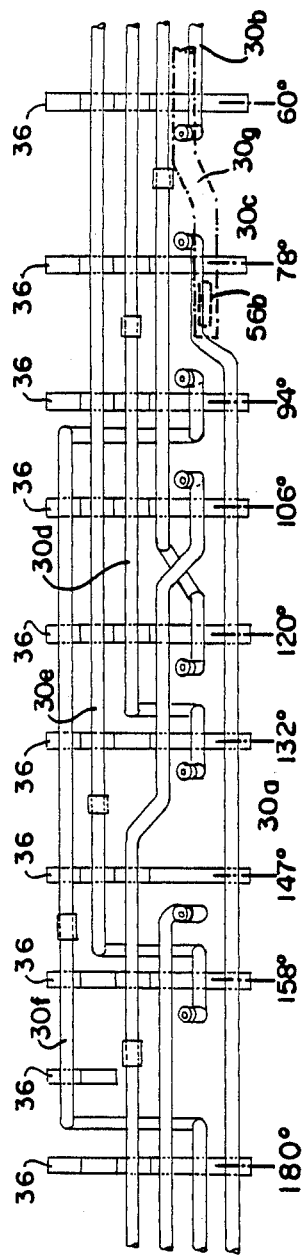
FIG. 6 is a developed view of the parallel ring structures shown in FIGS. 1–5.
Figure 6B:
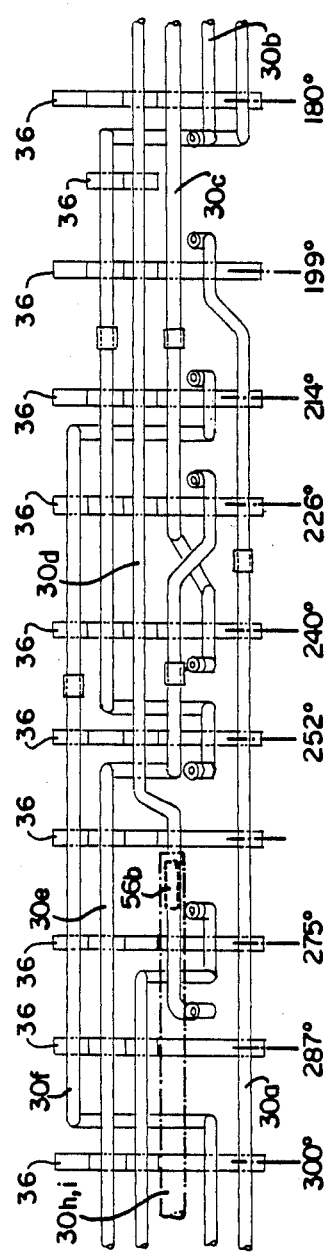
Figure 6C:
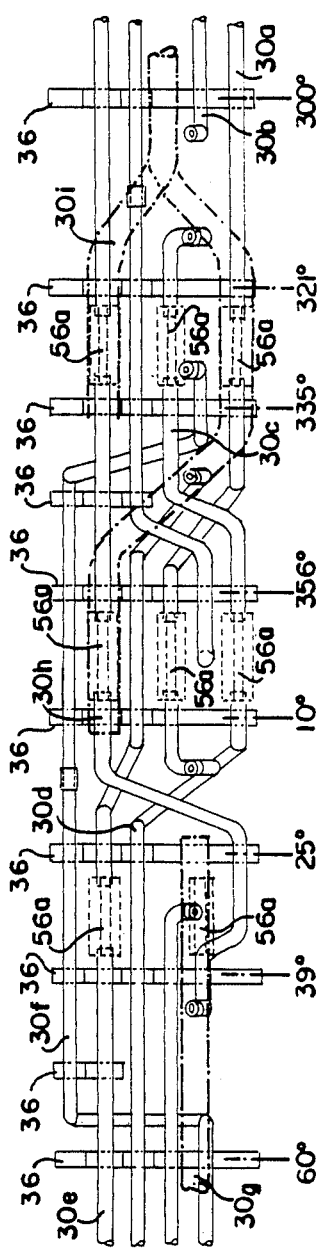

In order to solve the above identified problem relating to an adaptable arrangement for providing a method and apparatus for assembling the parallel conducting ring structure within the dynamoelectric machine regardless of the particular configuration of the machine, the conducting rings 30a through 30f are arranged as shown in the developed view of FIG. 6. Referring for the moment to that figure, in conjunction with FIGS. 1-5, it can be seen that the conducting rings 30a through 30f are arranged parallel one to the other in six banks ("bank 1" hereinafter referring to the bank which is closest to the stator core 14 and "bank 6" referring to the bank which is farthest away from the stator core 14).

The conducting ring 30f situated in bank 1 is positioned relative to the stator core 14 such that a strike distance for approximately 26 kilovolts is maintained. In accordance with one important aspect of the present invention, therefore, the conducting rings 30a through 30f are mounted upon a cleat 36 having a plurality of cylindrically shaped channels 38 formed therein. The cleat 36 having the conducting rings 30a through 30f thusly situated within its channels 38 is mounted to conventional means for supporting the stator winding 22 at its terminating ends 26a, 26b, 28a, and 28b, such as a support cone 40 which is mounted to the stator core 14. A spacer 42 is also utilized in accordance with the present invention between the conducting rings 30a through 30d and the support cone 40 to accommodate for variations in the bended radius of the conducting rings 30a through 30d, thereby firmly mounting such rings to the support cone 40 to prevent undesirable mechanical vibrations.

As shown in FIGS. 3, 5, 7 and 8, the cleats 36 are suitably mounted to the support cone 40 by bolt means 44 such as non-conductive bolts. In accordance with another important aspect of the present invention, the bolt means 44 is formed of threaded studs 46, such as fiberglass studs, which are attached to nuts 48 of a similar material. Before the bolt means 44 thus formed are threaded into the support cone 40 through the cleats 36, their threaded studs 46 are coated with a suitable lubricant, such as paraffin. Also coupled to the threaded studs 46 just beneath the cleat 36 are at least two belleville washers 50, formed of a non-conductive material such as fiberglass, which provide for a tight connection in spite of mechanical vibrations.

In order to provide adequate support and clamping of the conducting ring 30b (i.e., the conducting ring which enables the phase leads 32a and 32b to be connected to the terminating sides 26a, 26b, 28a, and 28b in a conventional manner), such conducting ring 30b is situated within the channel 38 comprising bank 5. This arrangement minimizes the effects of mechanical vibrations upon the phase leads 32a and 32b by positioning the conducting ring 30b as close as possible to the terminating sides 26a, 26b, 28a, and 28b. The conducting ring 30a, on the other hand, is situated within the channel 38 comprising bank 6 in order to facilitate a subassembly of the conducting rings 30a through 30f and the support cone 40 which is suitable for both standard and opposite parallel ring connections.

The conducting rings 30a and 30b contained in the channels 38 comprising, respectively, banks 6 and 5 are clamped between the cleat 36 and a member 52 which also includes cylindrically shaped channels 38. Bolt means 44, similar in all respects to the bolt means 44 used to attach the cleat 36 to the support cone 40, are also used to attach the member 52 to the cleat 36. Each of the bolt means 44 is suitably locked in place by pin means (not shown).

Referring again to FIGS. 7 and 8, the full phase or "double" current rings 30g, 30h, and 30i which are used to conduct the current generated by the dynamoelectric machine 10 to the main leads 34a, 34e, and 34f (comprising, respectively, T1, T5, and T6) will now be explained. For both standard and reverse directions of rotation of the rotor 16, connection to the main lead 34a (i.e., T1) is provided in accordance with the present invention by the full phase ring 30g which is situated beneath bank 5 along an arc extending from approximately 32° to approximately 82°. Such full phase ring 30g is clamped between a two-part member 54a and 54b which is attached to the cleat 36 by bolt means 44 as shown in FIG. 7. The bolt means 44 used to attach the two-part member 54a and 54b to the cleat 36 must be independent of the bolt means 44 used to secure the clamping member 52 in order to avoid problems associated with creep shrinkage.

For dynamoelectric machines which operate with a standard parallel ring connection, connection to the main lead 34e (i.e., T5) is provided in accordance with the present invention by the full phase ring 30h which is situated beneath bank 2 along an arc extending from approximately 268° to approximately 3°. In a similar manner, for dynamoelectric machines which operate with an opposite parallel ring connection, connection to the main lead 34f (i.e., T6) is provided by the full phase ring 30i which is also situated beneath bank 2 along an arc extending from approximately 268° to approximately 328°. The full phase rings 30h and 30i are also secured to the cleat 36 by a two-part member 54a and 54b clamped together by bolt means 44 as shown in FIG. 8.

Figure 9:
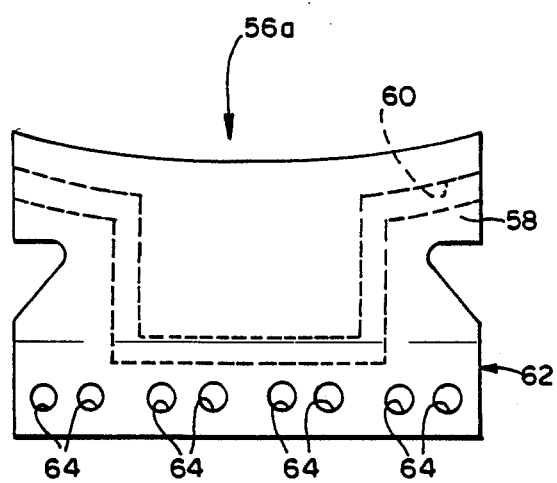
FIGS. 9 and 10 illustrate, respectively, side and end views of a first tab means in accordance with the present invention.
Figure 10:
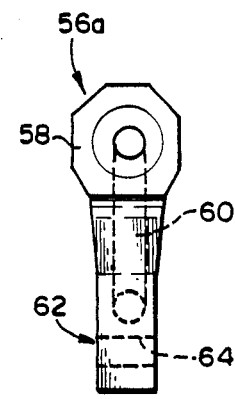
Figure 11:
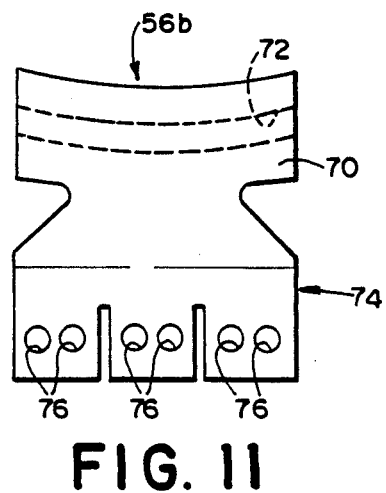
FIGS. 11 and 12 illustrate, respectively, side and end views of a second tab means in accordance with the present invention.
Figure 12:
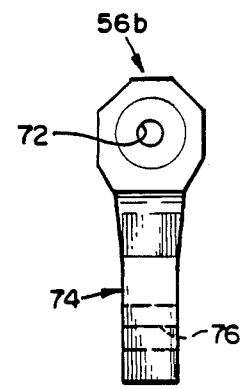

As is also shown in the developed view of FIG. 6, in conjunction with FIGS. 9–12, the conducting rings 30a through 30i include a plurality of tab means 56a and 56b which are used to conduct the current generated by the dynamoelectric machine 10 from the conducting rings 30a through 30i out through the main leads 34a through 34f. FIGS. 9 and 10 illustrate the tab means 56a which are used to connect the main leads 34a through 34f to their respective conducting rings, while the tab means 56b used to connect at full phase or "double" current joints is illustrated in FIGS. 11 and 12.

The tab means 56a are suitably formed in accordance with the present invention of a conductive member 58 which includes means for circulating the fluid coolant therethrough (such as a coolant path 60 formed in the conductive member 58) and a tab portion 62 having a plurality of connector holes 64 formed therein in order to connect the tab means 56a to a flexible connector portion 66 of the main leads 34a through 34f. Since the main leads 34a through 34f as utilized in accordance with the present invention comprise eight separate sub-leads, the flexible connector portions 66 are suitably formed of individual conductive members (not shown) which are covered with a braided material 68, and which have their end portions 66a and 66b stamped flat to form a portion which has two holes drilled therethrough for mating with respective connector holes 64 formed in the tab means 56a. It should be noted at this juncture that the particular number of sub-leads which are utilized in the flexible connector portions 66 of the main leads 34a through 34f is merely a function of the amount of current which the conductive members are designed to carry. Therefore, the number of sub-leads, as well as the number of connector holes 64, may vary without departing from the teachings of the present invention.

The tab means 56b, on the other hand, are formed as shown in FIGS. 11 and 12. In a similar manner as that utilized to form the tab means 56a, the tab means 56b include a conductive member 70 with means for circulating the fluid coolant therethrough (such as a coolant path 72 formed in the conductive member 70) and a tab portion 74 having a plurality of connector holes 76 formed therein for a tab-to-tab connection between the conducting rings. In accordance with yet another important aspect of the present invention, the tab portion 74 of the tab means 56b are split into three sub-portions in order to provide a more reliable, but flexible contact pressure. All connections at the tab means 56a and 56b (through the connector holes 64 and 76) are provided for by any suitable conductive bolt means (not shown). Furthermore, the tab means 56a and 56b are effectively connected to the conducting rings by any suitable means such as by brazing.

Referring again to FIGS. 2-8, a method of assembling the apparatus in a dynamoelectric machine for conducting current from the coils regardless of the particular configuration of the machine (i.e., whether "standard" or "opposite") will now be explained. The above described tab means 56a and 56b are provided for at locations as shown in the developed view of FIG. 6. Such tab means 56a and 56b are fully insulated with a suitable groundwall insulation, such as Thermalastic (a registered trademark of Westinghouse Electric Corporation), which permits the insulated metal of the tab means 56a and 56b to expand and contract without breakage of the insulation. When particular ones of the tab means 56a and 56b are required for connection of the main leads 34a through 34f to the conducting rings 30a through 30i (depending upon the particular configuration of the machine 10), the groundwall insulation is stripped from such tab means 56a and 56b. Each of the remaining tab means 56a and 56b which are not required for such connection remain insulated.

The main leads 34a and 34d (corresponding respectively to T1 and T4) are both connected at approximately 32° (FIG. 6). For T1, regardless of the particular configuration of the machine 10, the full phase or "double" current ring 30g is connected to the conducting ring 30b at 82° utilizing a tab-to-tab connection with tab means 56b. Thereafter, the full phase or "double" current ring 30g is routed beneath bank 5 where it is terminated at approximately 32° with tab means 56a for connection with the flexible connector portion 66 attached to main lead 34a. Also regardless of the particular configuration of the machine 10, connection for T4 is provided by tab means 56a attached to the conducting ring 30e (i.e., bank 2) at 32°.

Connection of the remaining main leads 34b, 34c, 34e, and 34f will now be explained for a standard parallel ring connection. The connection for main lead 34b (corresponding to T2) is made utilizing tab means 56a attached to the conducting ring 30c at approximately 3°, while the connections for main leads 34c and 34f (corresponding respectively to T3 and T6) are made utilizing tab means 56a attached to the conducting rings 30c and 30e at approximately 328°. One end of the full phase or "double" current ring 30h is provided with a tab-to-tab connection to the conducting ring 30c, utilizing tab means 56b, at approximately 268°, while the connection for main lead 34e (corresponding to T5) is made utilizing tab means 56a attached to the other end of the full phase or "double" current ring 30h, located beneath bank 2, at approximately 3°. Tab means 56a, attached to the conducting rings 30a and 30e at approximately 3°, remain insulated as described herein above and are unused for dynamoelectric machines 10 utilizing a standard parallel ring connection. Referring again to FIG. 3, there is shown a typical connection of the leads 34c (i.e., T3) and 34f (i.e., T6) for a standard parallel ring connection.

Connection of the remaining main leads 34b, 34c, 34e, and 34f will now be explained for an opposite parallel ring connection. The connection of the main lead 34b (corresponding to T2) is made utilizing tab means 56a attached to the conducting ring 30a at approximately 3°, while the connections for main leads 34c and 34e (corresponding respectively to T3 and T5) are made utilizing tab means 56a attached to the conducting rings 30a and 30a located, respectively, at 328° and 3°. One end of the full phase or "double" current ring 30i is provided with a tab-to-tab connection to the conducting ring 30c, utilizing tab means 56b, at approximately 268°, while the connection for main lead 34f (corresponding to T6) is made utilizing tab means 56a attached to the other end of the full phase or "double" current ring 30i, located beneath bank 2, at approximately 328°. Tab means 56a, attached to the conducting rings 30c and 30e at approximately 328°, remain insulated as described herein above and are unused for dynamoelectric machines 10 utilizing an opposite parallel ring connection. Referring again to FIG. 5, there is shown a typical connection of the leads 34c (i.e., T3) and 34f (i.e., T6) for an opposite parallel ring connection. Connections for the other leads 34a, 34b, 34d and 34e (i.e., T1, T2, T4 and T5) may be accomplished in a similar manner as shown in FIGS. 2, 4 and 6.

Obviously, many modifications and variations are possible in light of the above teachings. It is, therefore, to be understood that within the scope of the appended claims, the invention may be practiced otherwise than as specifically described herein.

What we claim is:

1. A dynamoelectric machine, comprising:
    a cylindrical stator core;
    a casing structure surrounding said stator core, said casing structure having an opening of predetermined size at an axial end of said stator core;
    a stator winding wound upon said stator core, said stator winding including a plurality of coils with each said coil having two terminating ends and means for circulating a fluid coolant therethrough;
    means for supporting said stator winding at said terminating ends, said supporting means being mountable to said stator core at said axial end;
    a plurality of conducting rings, mounted radially outward from said terminating ends upon said supporting means, each said conducting ring having means for circulating said fluid coolant therethrough and tab means for conducting current therefrom;
    phase lead extension means for electrically coupling said terminating ends to said conducting rings;
    a plurality of main leads for conducting current externally from the dynamoelectric machine; and
    main lead extension means for electrically coupling each said main lead to a preselected one of said tab means;
    wherein said conducting rings mounted upon said supporting means are insertable in the dynamoelectric machine through said opening in said casing structure.

2. The dynamoelectric machine according to claim 1, wherein said support means comprises a support cone.

3. The dynamoelectric machine according to claim 2, further comprising:
    cleat means for mounting said conducting rings substantially parallel one to the other to said support cone, said cleat means including a plurality of parallel, cylindrically shaped channels, one said channel containing a respective one of said conducting rings;
    non-conductive bolt means for mounting said cleat means to said support cone; and
    means, positioned between said conducting rings mounted within said cleat means and said support cone, for correctively spacing said conducting rings from said support cone.

4. The dynamoelectric machine according to claim 3, wherein said conducting ring mounted within said cleat means which is closest to said axial end is positioned to clear a preselected strike distance from said stator core.

5. The dynamoelectric machine according to claim 3, wherein said bolt means comprises:
    a plurality of non-conductive, threaded studs each of which are attached to respective non-conductive nuts;
    means for lubricating the threads of said studs; and
    at least two non-conductive belleville washers coupled to each said stud.

6. The dynamoelectric machine according to claim 3, wherein said cleat means comprises:
    a member having said parallel, cylindrically shaped channels formed therein, a first predetermined number of said channels being disposed beneath said support cone to expose a second predetermined number of said channels, outward from said support cone, proximate to said terminating ends; and
    a clamp having a plurality of parallel, cylindrically shaped channels corresponding to said second predetermined number, said clamp being secured to said member by bolt means.

7. The dynamoelectric machine according to claim 1, further comprising flexible means for connecting said main lead extension means to said tab means.

8. In a dynamoelectric machine having a cylindrical stator core with a plurality of coils wound thereupon, each of the coils having two terminating ends, a rotor mounted for rotation within the stator core, and a casing structure surrounding the stator core, the casing structure having an opening of predetermined size at an axial end of the stator core, improved apparatus for conducting current from the coils, comprising:
    means for supporting the terminating ends, said supporting means being mountable to the stator core at the axial end;
    a plurality of conducting rings, mounted radially outward from the terminating ends upon said supporting means, each said conducting ring having tab means for conducting current therefrom regardless of the direction of rotation of the rotor for a given direction in which electromotive forces generated by the dynamoelectric machine achieve a positive maximum value;
    phase lead extension means for electrically coupling the terminating ends to said conducting rings;
    a plurality of main leads for conducting current externally from the dynamoelectric machine; and
    main lead extension means for electrically coupling each said main lead to a preselected one of said tab means.

9. The improved apparatus according to claim 8, wherein said supporting means comprises a support cone.

10. The improved apparatus according to claim 9, further comprising:
    cleat means for mounting said conducting rings substantially parallel one to the other to said support cone, said cleat means including a plurality of parallel, cylindrically shaped channels, one said channel containing a respective one of said conducting rings;
    non-conductive bolt means for mounting said cleat means to said support cone; and
    means, positioned between said conducting rings mounted within said cleat means and said support cone, for correctively spacing said conducting rings from said support cone.

11. The improved apparatus according to claim 10, wherein said conducting ring mounted within said cleat means which is closest to the axial end is positioned to clear a preselected strike distance from the stator core.

12. The improved apparatus according to claim 10, wherein said bolt means comprises:
    a plurality of non-conductive, threaded studs each of which are attached to respective non-conductive nuts;
    means for lubricating the threads of said studs; and
    at least two non-conductive belleville washers coupled to each said stud.

13. The improved apparatus according to claim 10, wherein said cleat means comprises:

a member having said parallel, cylindrically shaped channels formed therein, a first predetermined number of said channels being disposed beneath said support cone to expose a second predetermined number of said channels, outward from said support cone, proximate to the terminating ends; and a clamp having a plurality of parallel, cylindrically shaped channels corresponding to said second predetermined number, said clamp being secured to said member by bolt means.

14. The improved apparatus according to claim 8, further comprising flexible means for connecting said main lead extension means to said tab means.

15. In a dynamoelectric machine having a cylindrical stator core with a plurality of coils wound thereupon, each of the coils having two terminating ends, a rotor mounted for rotation within the stator core, and a casing structure surrounding the stator core, the casing structure having an opening of predetermined size at an axial end of the stator core, a subassembly for conducting current from the coils regardless of a preselected direction of rotation of the rotor for a given direction in which electromotive forces generated by the dynamoelectric machine achieve a positive maximum value, comprising:

a support cone for supporting the stator winding at the terminating ends, said support cone being mountable to the stator core at the axial end thereof;

a plurality of conducting rings, mounted radially outward from the terminating ends upon said support cone, each said conducting ring having means for circulating a fluid coolant therethrough and tab means for conducting current therefrom;

cleat means for mounting said conducting rings substantially parallel one to the other to said support cone, said cleat means including a plurality of parallel, cylindrically shaped channels, one said channel containing a respective one of said conducting rings, said cleat means including a member having said parallel, cylindrically shaped channels formed therein, a first predetermined number of said channels being disposed beneath said support cone to expose a second predetermined number of said channels, axially outward from said support cone, proximate to said terminating ends, and a clamp having a plurality of parallel, cylindrically shaped channels corresponding to said second predetermined number, said clamp being secured to said member by bolt means;

non-conductive bolt means for mounting said cleat means to said support cone, said bolt means including a plurality of fiberglass, threaded studs each of which are attached to respective non-conductive nuts, means for lubricating the threads of said studs, and at least two non-conductive belleville washers coupled to each said stud;

means, positioned between said conducting rings mounted within said cleat means and said support cone, for correctively spacing said conducting rings from said support cone;

wherein said conducting ring mounted within said cleat means which is closest to the axial end of the stator core is positioned to clear a preselected strike distance from said stator core;

phase lead extension means for electrically coupling the terminating ends to said conducting rings;

a plurality of main leads for conducting current externally from the dynamoelectric machine; and main lead extension means for electrically coupling each said main lead to a preselected one of said tab means;

wherein said conducting rings mounted upon said support cone are insertable in the dynamoelectric machine through said opening in said casing structure.

16. The subassembly according to claim 15, wherein said tab means comprises a conductive member, connectable to said conducting rings at said means for circulating said fluid coolant therethrough, said conductive member including means for circulating said fluid coolant therethrough and a tab portion extending therefrom with a plurality of holes formed therein for reception of connecting means.

* * * * *